United States Patent [19]
Mueller

[11] 3,889,701
[45] June 17, 1975

[54] HIGHWAY TANKER WAGON AND METHOD OF MAKING AND DELIVERING LIQUID PRODUCTS

[76] Inventor: Noel J. Mueller, Box 28, Waubeka Village, Fredonia, Wis. 53021

[22] Filed: Apr. 1, 1974

[21] Appl. No.: 456,675

Related U.S. Application Data

[63] Continuation of Ser. No. 71,462, Sept. 11, 1970, abandoned.

[52] U.S. Cl. ................... 137/1; 137/267; 137/354; 280/5 D
[51] Int. Cl.² .......................................... B60P 3/24
[58] Field of Search ............ 137/267, 354, 1; 280/5

[56] References Cited
UNITED STATES PATENTS

| | | | |
|---|---|---|---|
| 1,801,749 | 4/1931 | McEachern | 137/267 |
| 1,985,207 | 12/1934 | Jensen | 137/354 X |
| 3,095,894 | 7/1963 | Jensen | 137/267 |

Primary Examiner—Alan Cohan
Attorney, Agent, or Firm—Finnegan, Henderson, Farabow & Garrett

[57] ABSTRACT

An improved multiple compartment tanker wagon has three compartments spaced along its lengthwise axis. The load carrying capability of the tanker wagon is exceeded if all three compartments are filled with a liquid. The load carrying capability is not exceeded when the method of filling the compartments is such that the two end compartments are filled and the center compartment is empty or when the two end compartments are empty and the center compartment is filled.

A method for making and delivering liquid products is provided wherein a liquid carrying vessel such as the aforementioned tanker wagon, has one portion of its liquid containing capacity filled with a liquid ingredient at a source of supply which is remote from the liquid product making location. The vessel, thus loaded, is delivered from the source of supply to the liquid product making location where the liquid ingredient is removed from the vessel and where the alternate portion of the vessel's liquid containing capacity is filled with the liquid product. In that condition the vessel is delivered to the liquid product destination where the liquid product is removed from the vessel. With all of its liquid containing capacity initially unoccupied, the vessel is returned to the source of supply of liquid ingredients to repeat the cycle. It is a further feature of the invention that that portion of the vessel which contains the liquid ingredients is normally not cleaned between uses.

7 Claims, 3 Drawing Figures

INVENTOR.
NOEL J. MUELLER

By Harry B. Keck
Attorney

HIGHWAY TANKER WAGON AND METHOD OF MAKING AND DELIVERING LIQUID PRODUCTS

CROSS-REFERENCES TO RELATED APPLICATION

This is a continuation of application Ser. No. 71,462 filed Sept. 11, 1970, now abandoned.

BACKGROUND OF THE INVENTION

1. Field of the Invention

Multiple compartment tanker wagons and a method of preparing and distributing liquid products, and especially polyester resin products, which method employs transportable multiple compartment vessels.

2. Description of the Prior Art

Tanker Wagons - Highway tanker wagons have been in use for many years. In general they comprise a wheel-mounted frame on which is secured one or more tanks usually cylindrical. The tank or tanks have manhole openings on top for filling and cleaning and have drain openings at the bottom for withdrawal of liquid contents. Water, milk, oil, gasoline, chemicals, syrups, foodstuffs and other liquids have been carried by such tanker wagons over highways. The tanker wagons are connected to a highway tractor which provides a readily assembled and disassembled motive power for transporting the wagon.

Multiple compartment tanker wagons have been available wherein two or more different and separated liquids can be transported in a single wagon. However, it has been a practice in the past for tanker wagons to be designed to be loaded essentially full.

Making and distributing liquid products - Liquid products frequently are produced at one location and are transported to the producer or user at a destination which is remote from the production location. Ingredients for making the liquid products are customarily delivered from a source of supply to the production location. Occasionally a single tanker wagon is used to deliver liquid products and to back-haul ingredients. When the ingredients or products are easily cleaned from the containers of the tanker wagon, such back-hauling creates significant savings. However there are many liquid product making applications which can not be adapted to such back-hauling practices.

The preparing and distribution of polyester resins is one such non-adaptable application.

In the preparation and distribution of polyester resins, the resin manufacturer establishes a resin production location and establishes one or more sources of supply of ingredients and establishes one or more product resin destinations, usually the customer's plants. The ingredients are sometimes shipped to the resin production locations by the manufacturer of the ingredients who ships the ingredients frequently in existing highway tanker wagons. Such tanker wagons customarily return empty to the source of supply.

A significant advance in this polyester resin production-distribution business was brought about recently when a resin manufacturer began a somewhat different sequence of operations wherein the product polyester resins at the resin production location are placed in a tanker wagon and are delivered to the resin destination where the resins are removed. A drum of suitable tank-washing solvent is carried on the tanker wagon and the solvent is pumped into the empty tank to wash away and clean the resin products from the walls of the tank. The solvent and washed resin are returned to the drum carried by the tanker wagon. The tanker wagon, with the empty, thus cleaned tank, is driven to the source of supply for polyester ingredients where the clean tank is filled with a suitable liquid ingredient of polyester resins. Generally such liquid ingredients are glycols which will not contaminate the tank and which are relatively easy to clean from the tank. The thus-loaded tanker wagon is returned to the resin production location where the liquid ingredients are discharged and the tank is washed under controlled conditions and refilled with product polyester resins to repeat the cycle. Note in this described cycle that the tank is empty during the trip from the resin destination to the source of supply of liquid ingredients. During all other trips the tank is filled to its weight capacity — either with liquid resin between the resin production location and the resin destination, or with liquid ingredients between the source of supply and the resin production location. Because it is possible to purchase raw materials as ingredients for polyester resins at the source of supply for considerably lower costs than would be required if the supplier delivers the ingredients to the resin production location, substantial savings have been achieved by this described cycle. One disadvantage of this described cycle is that the cleaning of the tank is carried out at a location which is remote from the resin production location and usually is not carried out under ideal, factory-controlled conditions. Consequently some contamination of the liquid ingredients from the source of supply may occur. Consideration of this possible contamination restricts somewhat the nature of the liquid ingredients which may be collected by the described trucking cycle. Another disadvantage of the described cycle is that certain characteristics liquid ingredients of polyester resins such as dicarboxylic acid anhydrides are quite difficult to clean from the walls of any container in which they are placed. Such materials normally are shipped in thermally insulated tanks in order to maintain them in a molten condition to facilitate their withdrawal at the intended point of storage or use. Because of the refractory character of these dicarboxylic acid anhydrides, it has not been possible to employ the described trucking cycle as a means of collecting the dicarboxylic acid anhydrides for use as an ingredient in polyester resin production. Instead the dicarboxylic acid anhydrides are delivered from a source of supply to a resin-making location in tanker wagons which are employed solely for such service. The tanker wagons return empty to the source of supply.

SUMMARY OF THE INVENTION

An improved trucking cycle for the production and distribution of liquid products has been conceived and, to accommodate the improved trucking cycle, an improved tanker wagon has been conceived and constructed, and a method for using such wagon has been developed.

The improved trucking cycle employs a tanker wagon wherein there are three independent containers of somewhat comparable size. The three containers are mounted in a common vessel or tanker wagon along the longitudinal axis so that there is a forward component, a central component and a rearward component. The allowable loading of the vessel is exceeded if all of the compartments are filled with liquid; but the allowable loading is not exceeded if the central compartment is filled and the end compartments are empty and vice-versa.

The liquid product is carried in Type I compartments and the liquid ingredients are carried in Type II compartments. These Type designations I and II are arbitrarily assigned herein for identification. If the central compartment is a Type I compartment, the two end compartments will be Type II compartments. However the liquid products may be carried in the end compartments which then would be identified as Type I compartments and the central compartment under those conditions would be a Type II compartment.

According to the improved trucking cycle, the resin producer again establishes a resin production location, one or more sources of supply, and one or more product destinations. The tanker vessel arrives empty at the source of supply where the Type II compartments are filled with liquid ingredients. In that condition, i.e., with the Type Ii compartments substantially filled and the Type I compartments substantially empty, the tanker is transported to the resin production location. At the resin production location the liquid ingredients are withdrawn from the tanker and product resin is delivered into the Type I compartment. In that condition, i.e., with the Type I compartments substantially filled and the Type II compartments substantially empty, the tanker is transported to the resin destination where the resin product is withdrawn from the tanker. Thereupon in that condition, i.e., with all compartments substantially empty, the tanker is returned to the source of ingredients supply to repeat the cycle. At no point in the cycle are all of the tanker compartments filled with liquids. Instead the tanker is transported over the highways with at least one set of its compartments (Type I or Type II) substantially empty at all times. It is understood that a small inventory of solvent may be maintained in the Type I compartment during the transportation of the tanker from the resin destination through the source of supply back to the resin production location in order to minimize any tendencies for gelation of undrained product resin.

Because the Type II compartments are used solely for liquid ingredients, the improvd trucking cycle will accommodate the collector of dicarboxylic acid anhydrides. Indeed it is contemplated that a principal liquid ingredient to be collected in the the improved trucking cycle is the dicarboxylic acid anhydride. The type II compartments need not be cleaned between uses, but instead, can be repeatedly filled with the dicarboxylic acid anhydride and thereafter drained perhaps twenty or thirty times before the Type II compartments require cleaning.

The improved tanker wagon which has been conceived to accommodate the improved trucking cycle has, according to the illustrated embodiment, a lengthwise axis and three compartments including a forward compartment, a central compartment, and a rearward compartment. The central compartment has a capacity which approximates the total capacity of the forward and rearward compartments together. In use, the central tank comprises one of the compartments (Type I or Type II) and the forward and rearward tanks comprise the correlative compartments (Type II or Type I). The three tanks thus are symmetrical with respect to the tanker wagon frame so that the load carried by the wagon will always be essentially balanced over the frame. If, for some reason, the forward and rearward compartments contain a liquid in a quantity which is less than the volume capacity of those two compartments, it is intended that the load shall be shared approximately equally between the forward and rearward compartments in the interest of maintaining an essentially balanced load.

Since distribution of weight on a symmetrical basis provides the mentioned balanced weight distribution, the three tanks can be run longitudinally, with internal baffles if desired, so that the two outside compartments constitute one type and the center compartment constitutes the other. dr

DESCRIPTION OF THE PREFERRED EMBODIMENT(S)

Polyester resins are well known commodities of commerce. See POLYESTERS AND THEIR APPLICATIONS, Bjorksten et al., Reinhold Publishing Corporation, New Yokr, 1956. In general, polyesters are formed by the reaction of polyols and polycarboxylic acids or polycarboxylic acid anhydrides. Typical polyols are glycols, glycerine, trimethylol propane, pentaerythritol, hydroxy functional oils, alkoxylated sugars and the like. Typical polycarboxylic (normally dicarboxylic) acids or acid anhydrides include maleic acid, fumaric acid, phthalic acid, isophthalic acid, terephthalic acid, itaconic acid, citraconic acid, tetrahydrophthalic acid, endomethylene-tetrahydrophthalic acid, maleic anhydride, phthalic anhydride, adipic acid, azelaic acid and the like. These materials are reacted in approximately stoichiometric proportions in resin making kettles. Some dicarboxylic acids such as fumaric acid and isophthalic acid are solid substances which do not liquefy.

Figure 1:
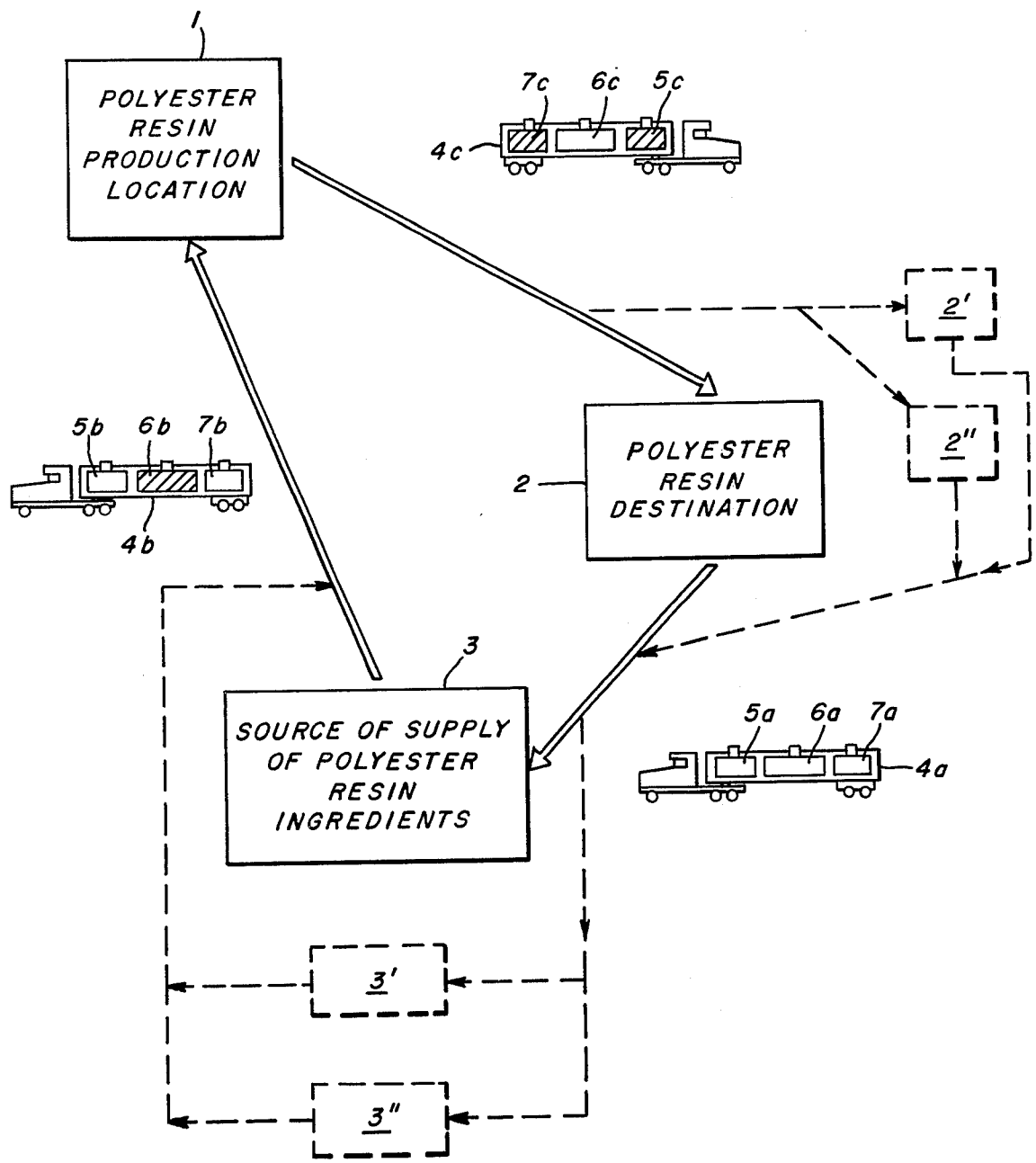
FIG. 1 is a schematic illustration of the present method of making and distributing liquid products, specifically polyester resins.

In accordance with the present improved resin making and distribution system, as shown in FIG. 1, the resin producer establishes a polyester resin production location 1, a polyester resin destination 2, and a source of supply of polyester resin ingredients 3. The location 1 normally will be separated by many miles, e.g., hundreds of miles, from the destination 2. Similarly the production location 1 will be separated by many miles (e.g., hundreds of miles) from the source of supply 3. It is further contemplated that the destination 2 will be separated from the source of supply 3 by many miles (e.g., hundreds of miles).

A tanker wagon shown schematically in FIG. 1 is identified by the numbers 4a, 4b, 4c and is shown as having three compartments 5, 6, 7. As the tanker wagon 4a arrives at the source of supply 3, all three of the compartments 5a, 6a, 7a are substantially empty. At the source of supply 3, the tanker has its Type II compartment 6b substantially filled with a liquid ingredient for the production of polyester resins, for example, a dicarboxylic acid anhydride such as molten maleic anhydride or molten phthalic anhydride. The compartment 6b is thermally insulated to retard cooling and consequent solidification of the liquid ingredient. The compartments 5b, 7b are substantially empty as the tanker 4b moves from the source of supply 3 to the polyester resin production location 1. Upon arrival at the location 1, the tanker 4b discharges the liquid ingredients from the Type II compartment 6b. if the compartments 5b, 6b, 7b or any of them require cleaning, they are cleaned under optimum producer-controlled conditions during the passage of the tanker 4b through the location 1. At the location 1, the tanker 4c has its Type I compartments 5c, 7c substantially filled with product polyester resin. The central compartment 6c remains substantially empty. Normally, the Type II compartment 6c will be merely drained, but not cleaned of its previous inventory of ingredients. Upon arrival at the polyester resin destination 2, the tanker 4c discharges its resin product contents from Type I compartments 5c, 7c and the tanker with all of its compartments 5a, 6a, 7a substantially empty is returned to the source of supply 3 to repeat the cycle. It is understood that the Type I compartments 5a, 7a may contain a small inventory of washing solvent to minimize any tendencies of undesirable gelation of residue resin during transportation. In the improved trucking cycle, the Type II compartment 6b will be substantially filled at the source of supply 3 and drained at the resin production location 1 and will experience no intervening cleaning before it is again substantially refilled at the source of supply 3.

It is understood that more than one resin destination is contemplated. e.g., destinations 2', 2''. Likewise alternate sources of supply 3', 3'' are contemplated. As geographic examples, the location 1 might be in Wisconsin. The destination 2 might be in Michigan; the destination 2' in Ohio; the destination 2'' in Pennsylvania; the source of supply 3 in Illinois; the source of supply 3' in Missouri; the source of supply 3'' in Indiana.

For the purposes of illustration, it has been assumed that the central compartment 6 of the tanker wagon 4 is the Type II compartment and that thee terminal compartments 5, 7 and the Type I compartments. The roles could be reversed with the central compartment 6 being Type I and the terminal compartments 5, 7 being Type II.

It should be observed that the tanker wagon 4 at no time has all three of its compartments 5, 6, 7 filled with liquid.

Figure 2:
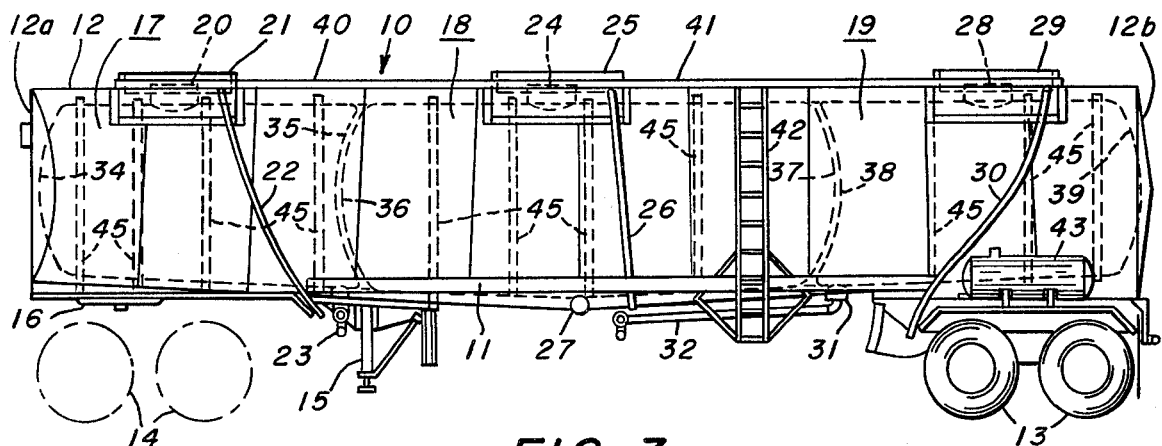
FIG. 2 is a side elevation view, partly in cross-section, showing the tanker wagon of this invention.

Referring to FIG. 2, there is illustrated a tanker wagon 10 which has been conceived and constructed to carry out the improved method of making and distributing polyester resins just described. The tanker wagon 10 includes a frame 11 which supports a cylindrical casing 12 and which is mounted on rear wheels 13. Forward wheels 14 are shown in phantom outline. These wheels 14 may be mounted on the frame 11 or, alternatively, the wheels 14 may comprise supporting wheels of a highway tractor (not shown). The frame 11 can be supported above the ground by means of a jack 15. A tractor connection device 16 is provided near the forward end of the tanker wagon 10 for quickly connecting and disconnecting a highway tractor. The cylindrical casing 12 includes a forward end wall 12a and a rearward end wall 12b. Within the casing 12 there is provided a forward tank 17, a central tank 18 and a rearward tank 19. A top opening manhole 20 is provided through the cylindrical casing 12 into the forward tank 17. A manhole dam 21 surrounds the manhole 20 and is connected to an overflow pipe 22 which is open to the ground beneath the frame 11. The forward tank 17 also is provided with a drain outlet 23 to permit rapid withdrawal of the liquid contents from the forward tank 17.

The central tank 18 has a top opening manhole 24 surrounded by a manhole dam 25 connected to an overflow pipe 26 which communicates with the ground beneath the frame 11. The central tank 18 has a drain outlet 27 to permit rapid withdrawal of the liquid contents from the central tank 18. The rearward tank 19 similarly has a top opening manhole 28 surrounded by a manhole dam 29 connected to an overflow pipe 30 which communicates with the ground beneath the frame 11. a drain outlet 31 is provided at the bottom of the rearward tank 19 to permit quick withdrawal from the liquid contents of the rearward tank 19. An extendable unloading pipe 32 is shown connected to the drain outlet 31 to direct the discharge of the contents from the rearward tank 19.

The forward tank 17 has a convex forward wall 34 and a concave rearward wall 35, thereby providing a nested arrangement which conserves space. The central tank 18 has a convex forward wall 36 and a concave rearward wall 37. The rearward tank 19 has a concave forward wall 38 and a convex rearward wal 39. The tanks 17, 18, 19 preferably are components of a single large internal tank which is fitted with convex end walls 34, 39 and also fitted with interior bulkheads which constitute the walls 35, 36 and 37, 38. Preferably thermal insulation is provided between the walls 35 and 36, between the walls 37 and 38, between the walls 34 and 12a, between the walls 39 and 12b and between the tanks 17, 18, 19 and the casing 12.

A top walkway 40 is mounted on the casing 12 between the manhole dam 21 and the manhole dam 25. A further walkway 41 is mounted on the casing 12 between the manhole dam 25 and the manhole dam 29. A ladder 42 is provided along the side of the casing 12 to facilitate access to the walkways 40, 41.

A solvent tank 43 is mounted along the side of the frame 11 to provide an inventory of solvent as may be required to wash or rinse the tanks 17, 18, 19.

Bulkhead stiffening ribs 45 are provided outside the tanks 17, 18, 19 and inside the cylindrical casing 12.

It is a feature of the present invention that the capacity of the central tank 18 approximates the cumulative capacity of the forward tank 17 and the rearward tank 19. In a typical tanker wagon constructed for the purposes of the present invention, the forward tank 17 has a capacity of 2,250 gallons and the rearward tank has a capacity of 2,250 gallons. The central tank 18 has a capacity of 4,000 gallons. The tanker wagon 10 is arranged such that the live loading of 4,500 gallons of liquid in the forward tank 17 and rearward tank 19 will not exceed the weight carrying capacity of the unit. Similarly the central tank 18 can carry 4,000 gallons of liquid without exceeding the weight carrying capacity of the wagon 10. However the weight carrying capacity of the tank wagon 10 will be exceeded (approximately by double) if all three of the tanks 17, 18, 19 are filled with liquid. Thus it is a design feature of the present tanker wagon that its volume carrying capacity exceeds its weight carrying capacity. A typical highway tanker of the prior art will have a weight capacity of about 40,000 pounds. Some prior art tanker wagons which are employed solely in delivering phthalic or maleic acid anhydride have a weight capacity of about 45,000 pounds. With this arrangement, if the Type I and Type II compartments are each designed to carry approximately the full rated load of the tanker wagon, the rated load is transported even though the other type compartment or compartments is or are empty. In other words, with the arrangement illustrated, if both types of compartments are fully loaded, the total load would be approximately double the federal or state legal load or rating. Thus, when handling several materials which should not be mixed at close to rated capaciyty, maximum efficiency and optimum operating conditions are achieved.

The improved tanker wagon of this invention thus can be more-or-less competitive in weight capacity with prior art tanker wagons which can not be utilized in the improve trucking cycle of this invention.

General Comments

The specific examples in the application are addressed to the production and distribution of polyester resins and especially wherein dicarboxylic acid anhydrides are selected as the liquid ingredient. Nevertheless the improved trucking cycle is applicable to any liquid product making operation which employs at least one liquid ingredient obtained from a remote source of supply.

The tanker wagon is described as having three compartments. it should be understood that the tanker wagon may have more than three compartments within the scope of this invention. For example, the tanker might have 40 compartments, with 15–25 being used as Type I compartments and the remaining 25–15 being used as Type II compartments. The multiple compartments could be used for collecting and delivering liquid bromine or liquid chlorine, for example. The Type I compartments in such example will be distributed over the longitudinal axis to present a substantially balanced load. Similarly the Type II compartments will be distributed over the longitudinal axis to present a substantially balanced load.

While the invention has special applicability to liquid ingredients and liquid products, it may also be employed with solid ingredients such as isophthalic acid or solid products. Suitable feed and removal apparatus such as pneumatic systems, screw conveyors, conveyor belts and the like will be provided to discharge the solid contents of the tanker wagon.

The tanker wagon of this invention may be employed in a prior art trucking cycle by using only the Type I compartments and collecting, during a back-haul, a compatible liquid ingredient such as glycol. In such service, the Type Ii compartments would be substantially empty throughout the trucking cycle. Thus the tanker wagon would be useful apart from the improved trucking cycle of this invention.

The present tanker wagon has additional utility in other improved trucking cycles, the delivery of liquid products and the collection and discarding of liquid residues. This improved trucking cycle is illustrated schematically in FIG. 3.

A product making location 50 produces liquid products, for example, gasoline. A product destination 51 receives the liquid product, for example, a gasoline storage tank farm located near a large city which is remote from the product making location 50. A residue making location 52 produces useful products as well as residues which must be discarded. such residues might be tarry bottom products from chemical or petroleum refineries. A residue discarding location 53 such as an incinerator is equipped to consume the liquid residues from the residue making location 52.

A two-component tanker wagon 54 has a Type I' compartment 55 and two Type II' compartments 56, 57. The Type II' compartments are used for receiving, confining and discharging a useful liquid product. The Type I' compartment is used for receiving, confining and discharging a liquid material which is not compatible with the useful liquid product.

As suggested by the broken line 58, the residue discarding location 53 and the product making location 50 might be located within a single refinery boundary. As suggested by the broken line 59, the product destination 51 and the residue making location 52 might be located within the boundary of a single refinery. The two-component vessel 54 arrives at the residue making location 52 with all of its compartments 55, 56, 57 substantially empty. A liquid residue is delivered into the Type I' compartment 55a and the vessel 54 is transported to the residue discarding location 53 where the contents of the Type I' compartment 55a are discharged and discarded. The vessel 54 then is transported from the residue discarding location 53 to the product making location 50 with all of its three compartments substantially empty. At this point the Type II' compartments may be cleaned in a cleaning zone 60 for reuse. It is contemplated that the Type I compartments will not be cleaned in this trucking cycle.

The vessel 54 has its Type II' compartments 56a, 57a filled with liquid product at the product making location 50 and is transported to the product destination 51 where the liquid products are discharged. The vessel 54 is transported from the product destination 51 to the residue making location 52 with all three of its compartments substantially empty. The described trucking cycle then is repeated starting from the residue making location 52.

Figure 3:
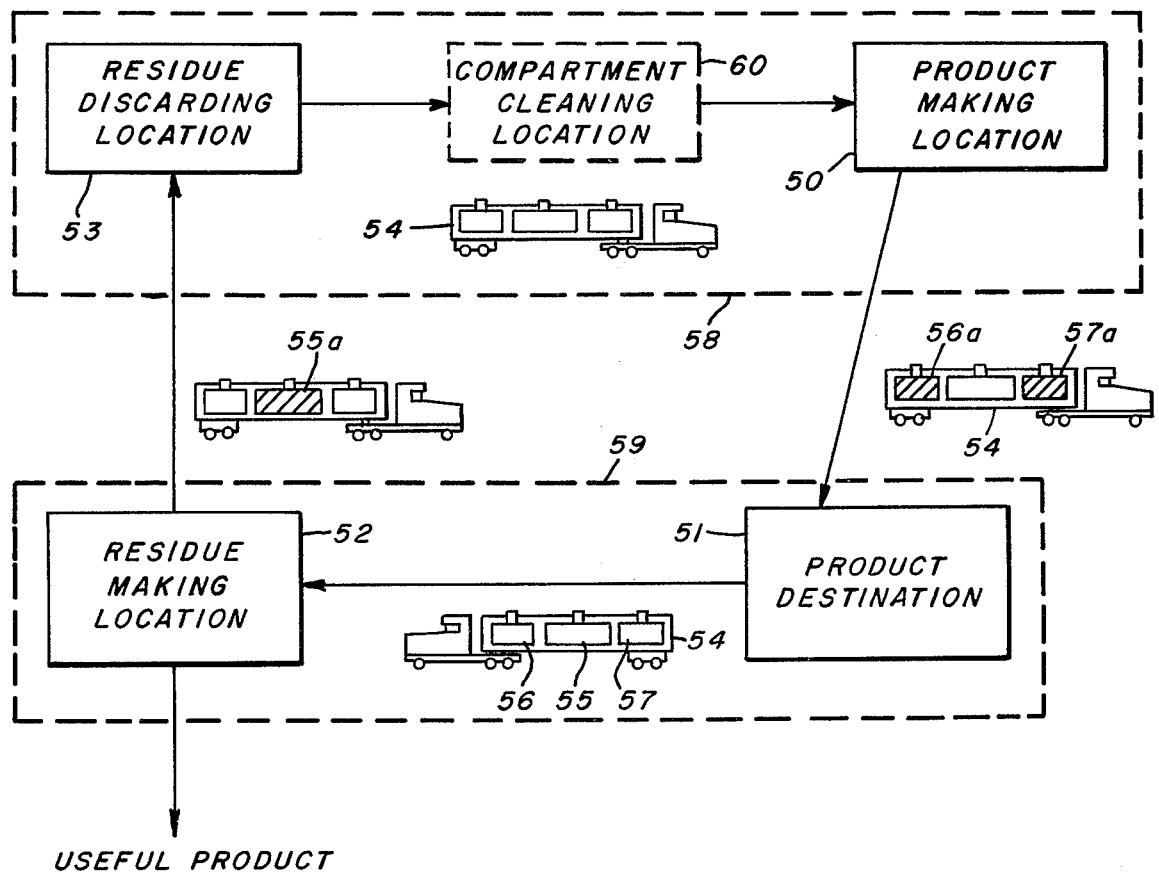
FIG. 3 is a schematic illustration of an alternative method for trucking liquid products employing the improved tanker wagon of this invention.

The described trucking cycle illustred in FIG. 3 has particular applicability to a trucking operator who can maintain on his own property a residue discarding location 53 which includes a cleaning zone 60. Such a trucking operator can successfully engage in the business of deliering a liquid product from a producer, located at a product making location 50, to the producer's customer, located at a product destination 51. The trucking operator will avoid an empty back-haul to the product making location 50 by adopting the described improved trucking cycle wherein the Type I' compartment will be filled with a residue. The trucking operator then obtains revenue from (a) the trucking activity involving delivery of product from the product making location 50 to the product destination 51; and (b) the residue making location 52 for his residue discarding services. The trucking operator also is enabled to maintain control over the quality of the cleaning operation which is conducted under his supervision at his cleaning zone 60 so that a substantially clean vessel is returned to product delivery portion of the cycle.

I claim:

1. The method of producing and delivering liquid products which are prepared from liquid ingredients,
    1. establishing a liquid product production location;

2. establishing a source of supply for said liquid ingredients;
3. establishing a liquid product destination;
4. establishing within a multiple-zone tanker vessel
    a. a Type I zone for receiving said liquid products; and
    b. a Type II zone for receiving said liquid ingredients;
5. filling said Type II zone with said liquid ingredients at said source of supply and delivering said vessel to said production location;
6. removing the said liquid ingredients from the said vessel at said production location;
7. filling the said Type I zone with said liquid product, at the said production location;
8. delivering said vessel to the said liquid product destination;
9. removing said liquid product from the said vessel at the said liquid product destination;
10. transporting said vessel with both said Type I zone and said Type II zone substantially empty to said supply source; and
11. repeating steps 5 through 11 in sequence.

2. The method of claim 1 wherein step 11 is carried out a plurality of times without intervening cleaning of the said Type II zone.

3. The method of claim 1 wherein the liquid ppoduct is a polyester resin.

4. The method of claim 1 wherein the liquid ingredient is a dicarboxylic acid anhydride selected from the class consisting of maleic acid anhydride and phthalic acid anhydride.

5. The method of claim 1 wherein a supply of washing solvent is provided in the Type I zone following step 9.

6. The method of claim 1 wherein the Type I zone is cleaned following step 5 and before step 7.

7. The method of handling liquid products and ingredients which comprises
   1. establishing within a multiple-zone tanker vessel
       a. a Type I zone for receiving said liquid product; and
       b. a Type II zone for receiving said liquid ingredients; such that the weight carrying capacities of said zones with respect to said products and ingredients, respectively, are equal to each other and to the weight carrying capacity of said tanker vessel;
   2. filling only said Type I zone with said liquid product to full weight capacity when it is desired to transport such product; and
   3. filling only said Type II zone with said liquid ingredients to full weight capacity when it is desired to transport such ingredients.

* * * * *